United States Patent [19]

Rowland-Hill

[11] 4,031,901
[45] June 28, 1977

[54] CONCAVE FOR AN AXIAL FLOW TYPE COMBINE

[75] Inventor: Edward W. Rowland-Hill, Lancaster, Pa.

[73] Assignee: Sperry Rand Corporation, New Holland, Pa.

[22] Filed: June 7, 1976

[21] Appl. No.: 693,676

[52] U.S. Cl. .............................. 130/27 T; 130/27 J
[51] Int. Cl.² .......................................... A01F 12/24
[58] Field of Search ............. 130/27 J, 27 JT, 27 K, 130/27 L, 27 R, 27 T; 56/14.6

[56] References Cited

UNITED STATES PATENTS

| 3,439,684 | 4/1969 | Davidow et al. ................. 130/27 R |
| 3,927,678 | 12/1975 | Rowland-Hill .................... 130/27 T |
| 3,995,645 | 12/1976 | Rowland-Hill .................... 130/27 T |

FOREIGN PATENTS OR APPLICATIONS 2,035,186  12/1970  France .............................. 130/27 J

*Primary Examiner*—Russell R. Kinsey
*Attorney, Agent, or Firm*—Michael R. Swartz; Frank A. Seemar; Joseph A. Brown

[57] ABSTRACT

In an axial flow type combine, an improved concave is provided which remains open in the most adverse corn harvesting conditions, thereby increasing the overall efficiency of the machine. The improved concave comprises a frame formed by a plurality of spaced-apart transversely extending arcuate shaped support members joined together at their respective ends by a pair of spaced-apart longitudinally extending support elements. The frame supports a plurality of spaced apart longitudinally extending rod-like members which are generally linear throughout a substantial portion of their longitudinal extent, the linear portions of the respective rod-like members being generally parallel to the axis of a rotor positioned above the concave in the combine. The rod-like members are provided with rotatably mounted sleeves which freely rotate about the rod-like members as crop material moves over the concave. These rotatable sleeves facilitate the passage of threshed crop material through the openings in the concave defined between the sleeves and further serve to reduce the impact of the crop material against the concave, thereby resulting in less crop damage.

40 Claims, 6 Drawing Figures

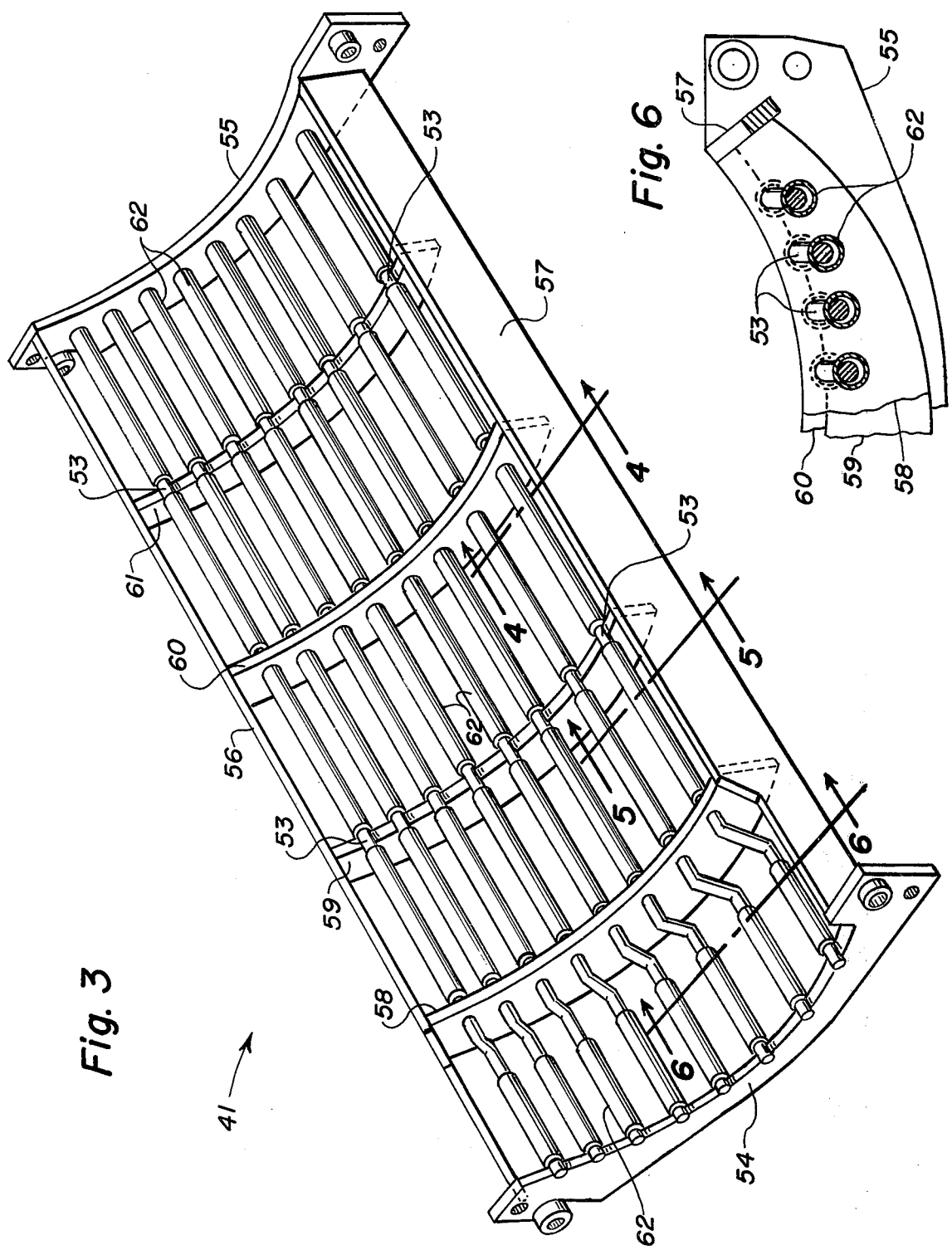

CONCAVE FOR AN AXIAL FLOW TYPE COMBINE

CROSS REFERENCE TO RELATED APPLICATIONS

The present invention, in part, is generally related to the subject matter of co-pending application, U.S. Pat. Ser. No. 641,220, now U.S. Pat. No. 3995645 entitled "Axial Flow Combine Having Concave Relief" by Edward W. Rowland-Hill filed Dec. 16, 1975 and assigned to the same assignee as the present invention.

BACKGROUND OF THE INVENTION

1. Field of the Invention

The present invention relates to axial flow type combines and, more particularly, is directed to an improved structure used in such combines. While, the improved concave structure is disclosed herein in connection with an axial flow combine of the type having two side-by-side threshing and separating mechanisms, it is to be understood that the improved concave structure is equally applicable to an axial flow combine of the type having only one threshing and separating mechanism.

2. Description of the Prior Art

In an axial flow type combine, the threshing and separating mechanism includes a rotor and an associated concave which each extends axially in the direction of movement of the combine across the field. The crop material is fed into the front end of the mechanism, whereupon the rotor circumferentially sweeps the incoming crop material so as to move the material across the concave several times during the threshing and separating operation. This type of motion makes it imperative that grain threshed from the material be discharged through the concave as soon as possible to prevent any kernal damage. To do this, it is necessary to eliminate any clogging of the concave by unthreshed crop material.

It has been noted that in situations where either the crop material is damp or in high moisture corn conditions, conventional type concaves clog, thereby preventing the grain from being effectively removed from the incoming crop. Concave clogging occurs when the crop adheres to a portion of the concave so as to obstruct the openings contained in the concave. This clogging of the concave causes kernel damage in some crop conditions, especially high moisture corn, and also creates an uneven distribution of material across the cleaning system which adversely effects the overally effectiveness of the cleaning operation of the combine.

The problem of the concave clogging was alleviated to some extent by the structure in U.S. Pat. No. 3,927,678, that being the addition of rollers to the curved transversely extending wires. As disclosed therein, the concave included a number of longitudinally extending bars supported on a number of rib members, with a series of removable curved wires transversely extending through the longitudinal bars to form a grate-like structure. Removable rollers were inserted over the transversely extending curved wires to assist in the movement of crop material over and through the concave.

However, it has been found that the structure disclosed in the aforesaid patent does not provide the optimum solution to the concave clogging problem under all crop conditions.

SUMMARY OF THE INVENTION

The present invention provides a new and improved concave for an axial flow combine which overcomes the aforementioned problems of the prior art. More particularly, the concave has an improved construction which remains open and does not clog in the most adverse corn harvesting conditions. The improved concave structure facilitates the passage of threshed crop material therethrough, and further, promotes gentle handling of the crop material which minimizes the possibility of kernel damage during the threshing and separating process.

Accordingly, in its preferred embodiment, the improved concave comprises a generally arcuate-shaped frame which supports a plurality of spaced-apart rod-like members forming a grid structure having openings for the passage of threshed and separated crop material therethrough. More particularly, the frame is formed by a pair of spaced apart longitudinally extending elements and a plurality of spaced apart arcuate shaped support members transversely extending between the longitudinal elements.

The rod-like members longitudinally extend generally perpendicular to the transverse support members and are seated on some of the support members and are received by others of the support members. The rod-like members are generally linear throughout a substantial portion of their longitudinal extent, the linear portions being generally parallel to each other.

Further, the improved concave includes sleeves rotatably mounted on some of the rod-like members so as to freely rotate about the rod-like members upon impact of crop material against the concave, thereby reducing the impact forces imposed on the crop material, thus resulting in decreasing the damage to the material. Preferably, the sleeves have an inside diameter greater than the outside diameter of the rod-like members, such that they may be easily inserted over the rod-like members. The sleeves are transversely spaced from one another on adjacent rod-like members so as to form opening therebetween.

The support members are generally parallel and are generally concentric about the same axis. The radial distances of those support members having rod-like members seated thereon from the aforementioned axis are generally equal and somewhat greater than the generally equal radial distances of those other support members that receive the rod-like members therethrough. Those other support members also have upper portions disposed above the rod-like members which tend to retard the advance of crop material along the concave.

Still further, the frame of the improved concave includes a front portion having a step down configuration forming an inlet region, the front portion of each of the rod-like members having s step down configuration corresponding to that of the concave frame front portion. The front portion of each rod-like member extends a short distance rearwardly from the front support member and then bends upwardly and rearwardly and joins its linear portion. The rearwardly-extending parts of the front portion of each of the respective rod-like members, in the inlet region, are parallel to, but disposed at a level lower than, the linear portions of the respective rod-like members.

These and other advantages and attainments of the present invention will become apparent to those skilled in the art upon reading of the following detailed description when taken in conjunction with the drawings wherein there is shown and described an illustrated embodiment of the invention.

BRIEF DESCRIPTION OF THE DRAWINGS

In the course of the following detailed description, reference will be frequently made to the attached drawings in which:

FIG. 3 is an enlarged perspective view of the improved concave removed from the combine.

FIG. 6 is an enlarged fragmentary view taken along line 6—6 of FIG. 3, showing the relationship of the front portions of rod-like members in the step down inlet region of the concave.

DETAILED DESCRIPTION OF THE INVENTION

In the following description, right hand and left hand references are determined by standing at the rear of the machine and facing in a direction of forward travel. Also, in the following description, it is to be understood that such terms as "forward," "rearwad," "left," "upwardly," etc., are words of convenience and are not to be construed as limiting terms.

IN GENERAL

Figure 1:
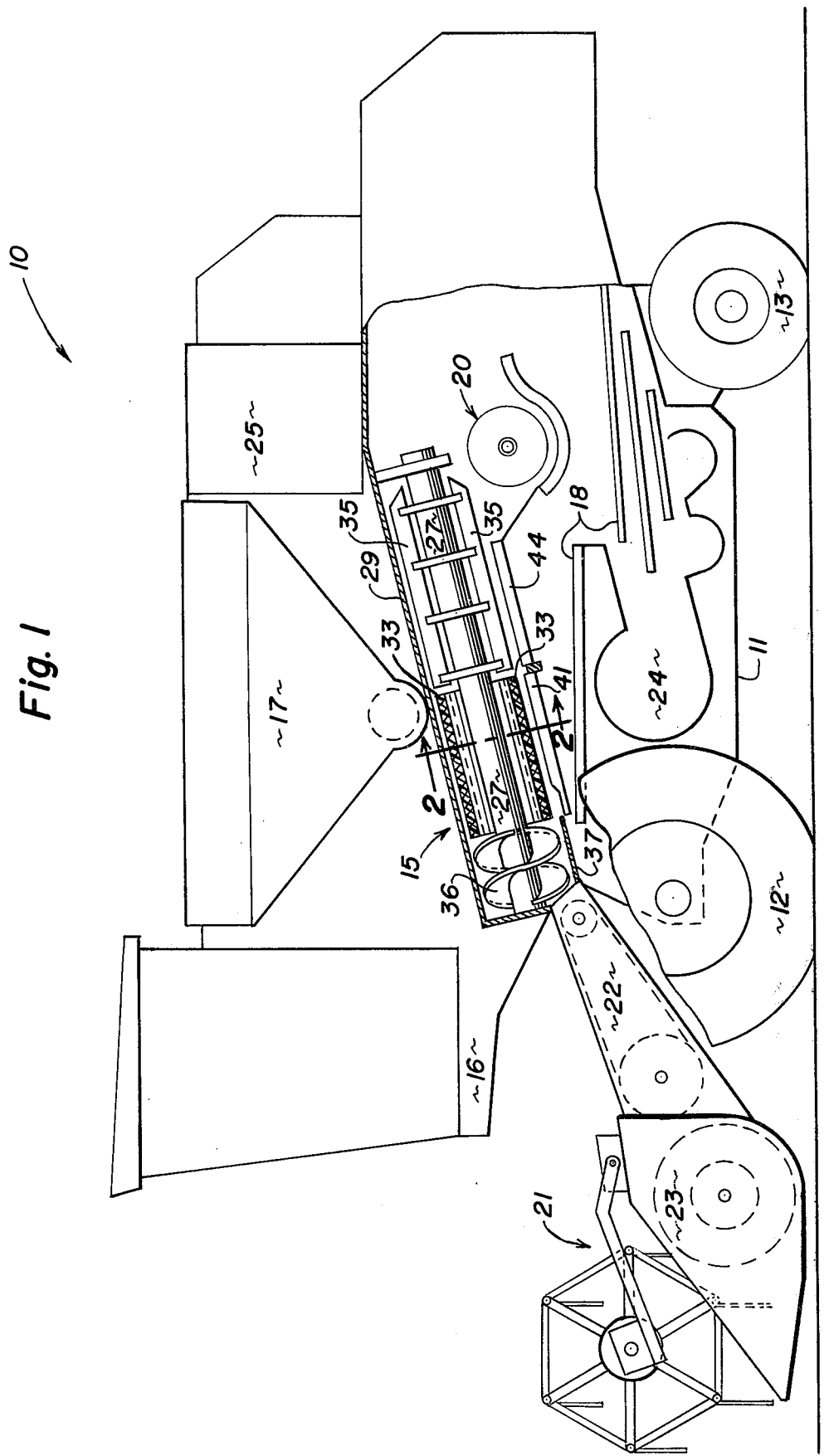
FIG. 1 is a side elevational view, partly in section, of the combine embodying the present invention.

Referring now to the drawings, and particularly to FIG. 1, there is shown an axial flow type combine, being indicated generally by the numeral 10, which incorporates the preferred embodiment of the present invention. While the combine illustrated herein is of the self-propelled type, it will be readily apparent to those skilled in the combine harvester art that the principles of the present invention are equally applicable to a pull-type model as well as to other similar devices.

The combine 10, described herein, comprises a mobile frame or a housing 11 supported on a pair of front drive wheels 12 and a pair of rear steerable wheels 13 (only the left wheel of each pair being shown in FIG. 1). The housing 11 encloses and supports a threshing and separating mechanism preferably in the form of two side-by-side units 14,15 (only the left unit 15 being shown in FIG. 1) which axially extend in the direction of the longitudinal axes of the combine, an operator's platform 16, a grain tank 17, grain handling and cleaning means 18 and a rotary discharge means 20. On the front of the combine is a conventional header 21 and crop elevator 22. The header 21 is of the grain type but other forms of headers may be employed, as for example a corn header, depending on the crop to be harvested.

As the combine 10 is propelled forwardly over a field, the crop material to be harvested is served from the stubble and consolidated laterally by two opposed augers 23 (shown in broken line form in FIG. 1) which feed the severed crop material rearwardly through a central opening in the rear wall of the header to the crop elevator 22 which in turn conveys the material upwardly and rearwardly to the inlet end of the threshing and separating units 14,15. The material received within the threshing and separating units 14,15 will be threshed and separated, that is to say that the crop material (which may be wheat, corn, rice, soy beans, rye, grass seed, barley, oats, or other similar crop materials) is rubbed and beaten whereby, the grain, seed, kernels, etc. is separated from the straw, stalks, cobs or other discardable part of the crop material. While the terms grain and straw are used principally throughout this application for convenience, it should be understood that the terms are not intended to be so limited. The term grain herein thus refers to that part of the crop material that may be threshed and separated from the discardable part of the crop material which will be referred to as straw.

The straw and other discardable material is discharged from the rear of the axial flow units 14,15 onto a guide plate of the rotary discharge means 20 which propels the material rearwardly through the discharge hood of the combine and onto the ground. The grain and other material separated from the straw falls onto the grain cleaning and handling means 18 which includes means to separate clean grain and means to separate unthreshed material (known in the art as tailings) from the remainder of the material received in the cleaning means. A rotary fan 24, supported within the housing 11, and disposed below the axial units 14,15, is provided to blow the chaff out the rear of the machine as the grain falls through the sieves of the cleaning means 18. The clean grain is then elevated by an elevator (not shown) into the grain tank 17 and the tailings are elevated and delivered by an elevator (not shown) to the inlet end of the threshing and separating mechanism where it joins the unthreshed grain being fed into the mechanism by the crop elevator 22 to thereby repeat the threshing and separating cycle.

On the top of the combine, rearwardly of the grain tank 17, is an internal combustion engine 25 of sufficient horsepower to suitably drive the combine, through conventional transmission means, not shown, and to operate the header 21, crop elevator 22, axial units 14,15 rotary discharge means 20, grain handling and cleaning means 18 and other power operated components of the combine 10.

THRESHING AND SEPARATING MECHANISM

In the preferred embodiment, the threshing and separating mechanism of the combine is in the form of two units 14,15 disposed in adjacent side-by-side relation. However, it should be appreciated that the invention as described and shown in this embodiment is equally applicable to a combine having a single threshing and separating unit.

Figure 2:
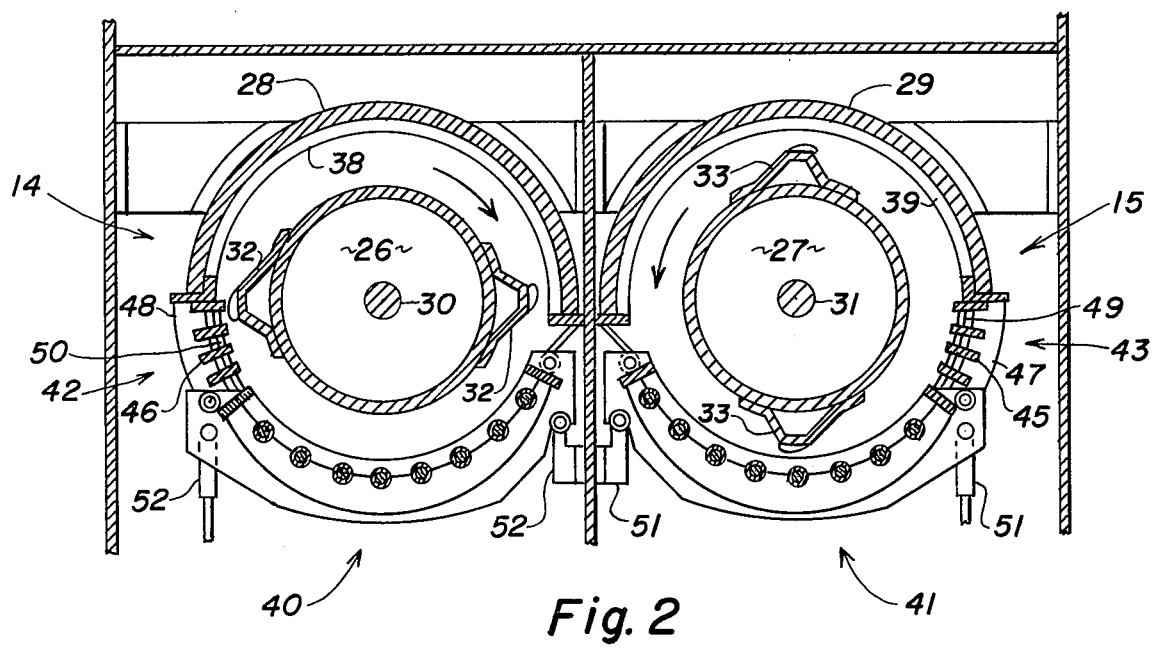
FIG. 2 is an enlarged sectional view taken along line 2—2 of FIG. 1.

In referring to FIGS. 1 and 2, the threshing and separating axial flow units 14,15 comprise fore-and-aft extending generally cylindrical rotors 26,27 housed within fore-and-aft extending generally cylindrical casings 28,29. The term "generally cylindrical" as applied to the rotors and casings is not intended to be limiting and, as such, covers similar shapes such as polygonal. Each of the units 14,15 includes a front threshing section and a rear separating section.

The rotors 26,27 are rotatably mounted within the respective casings 28,29 in concentric relationship thereto and the drive means are arranged to drive both rotors in opposite directions, as shown by the arrows in FIG. 2, downwardly at their adjacent sides. Each of the rotors 26,27 are substantially identical, except for their adaption to opposite rotation, and comprise a generally cylindrical shape main body portion having front and rear stub shafts (only the front stub shafts 30,31 being shown in FIG. 2) which are journalled for rotation within bearings, not shown, suitably mounted on respective walls of the main housing 11. The front threshing section of each of the rotors 26,27 preferably includes a pair of spaced apart and diametrically opposed rasp bars 32,33, being mounted on the peripheral surface of the main body portion of each rotor and extending longitudinally therealong, generally parallel to the axis of the rotor. The rear separating section of each of the rotors 26,27 preferably includes a pair of spaced-apart and diametrically opposed separator blades (only blades 35 of the left rotor 27 are shown in FIG. 1) extending radially outwardly and longitudinally along the respective rotor main body portion. Each of the separator blades on a respective rotor is in alignment with a corresponding rasp bar and is mounted in a similar fashion such that the outer surface of each separator blade is co-planar with the outer surface of the respective rasp bar.

Mounted on each of the front stub shafts 30,31, forwardly of the threshing sections of the respective rotors 26,27, is feed means in the form of an auger 36 which feeds crop material rearwardly into the inlet end of the threshing and separating units 14,15. Material gathered by the header 21 is carried by the crop elevator 22 upwardly and rearwardly to ramp 37 that directs the material up and into an immediate portion of the augers, in an undershot manner.

The casings 28,29 being generally cylindrical, have curved upper portions which longitudinally extend the entire length of the units and encompass a major portion of the respective rotors 26,27. The upper portions of the respective casing 28,29 contain directional vanes 38,39 (best shown in FIG. 2) mounted on the inner sides thereof and positioned at an angle to the respective axes of the rotors 26,27 to assist the rasp bars 32,33 in moving the crop material longitudinally through the casings. In the threshing section, the lower portions of the respective casings 28,29 is made up of respective concave assemblies including concaves 40,41 and outer concave extensions 42,43 respectively (best seen in FIG. 2). A separate grate 44 (only shown diagrammatically in FIG. 1) completes the general cylindrical configuration of each of the respective casings 28,29 in the rear separating sections.

The concaves 40,41, being the subject of this invention, will be discussed in detail later on in this specification; however, at this point, it should suffice to say that they have aperatures or spacings for the passage of grain material therethrough. The outer concave extensions 42,43 being of arcuate shape, are coupled to the outer edges of the concaves and extend between the concaves and the respective upper portions of the casings 28,29, the general purpose being to supplement the threshing areas of the main concaves. U.S. Pat. No. 3,696,815 is directed specifically to the subject matter of the concave extensions and sets forth the general purposes and detail structures thereof. The concave extension 42,43 are substantially identical, each briefly comprising longitudinally-extending bars 45,46 secured to arcuate support beams 47,48, with removable wires 49,50 extending through the bars 45,46 thereby forming an open cell-like structure for the passage of threshed grain material therethrough.

Preferably, the concaves 40,41 are adjustably supported beneath the rotors 27,28 by means 51,52 so that the spacing between the concaves and the respective rotors 26,27 can be varied to obtain the best operating performance, depending on the crop and condition of the crop material to be threshed. The concave adjustable support means 51,52 forms no part of the present invention and as such have only been shown fragmentarily in FIG. 2. The adjustable support means may be of the type which is fully discussed and illustrated in U.S. Pat. No. 3,949,761. Further, it should be noted here that as the concaves are moved to vary the spacings, the outer extensions move with the concaves.

The separator grates 44 are disposed in the respective lower portions of the separating sections of the casings 28,29, generally beneath the separating blades 35 (only shown diagrammatically in FIG. 1) and are of a conventional design comprising a plurality of transversely extending ribs which support a plurality of longitudinally extending support bars that have curved wires extending therethrough, thereby forming an open grate structure. The above-described separator grate structure is similar to the structure of a conventional concave.

During operation, as the combine 10 is propelled forwardly over the field, the crop material is severed and consolidated by the header 21 and conveyed upwardly and rearwardly by the crop elevator 22 and delivered in an undershot manner to the feed augers 36 in the inlet end of the threshing and separating units 14,15. Augers 36 feed the incoming crop material rearwardly toward the front portions of the rasp bars 32,33. In the threshing section, the rasp bars 32,33 draw the crop material rearwardly and circumferentially (spiral movement), sweeping the material several times over the concaves 40,41 and concave outer extensions 42,43 as it advances rearwardly by the assistance of the directional vanes 38,39, into the separating section. The material continues its spiral movement through the separating section, being subjected to a continuous separating action by the co-action between the separating blades 35 and grates 44, and passes through discharge openings in the rear of the axial units 14,15 and onto the discharge means 20 wherein the straw is discharged onto the ground, rearwardly of the combine. The grain, which has been removed from the straw, passes through the concaves and grates onto grain cleaning and handling means 18 as described above. The threshing and separating process is principally a rubbing and beating action to extract the grain from the straw and then a tumbling or agitating of the straw to separate the grain entrapped in the straw. The major portion of the grain is threshed and separated from the straw in the threshing section, whereas, the remaining grain is dislodged from the straw in the separating section.

IMPROVED CONCAVE

In turning to the description of the improved concave, it should first be re-emphasized that even though the improved concave structure has been shown, in its preferred embodiment, in connection with an axial flow combine of the type having two side-by-side, longitudinally extending, axial flow units, the improved concave structure as discussed hereinafter is equally applicable to a combine having a single axial flow unit, as well as, to conventional types of combines. Further, in regards to the above-described twin axial flow unit combine, the concave and the grate of each unit could be dissimilar in structure (as shown) or similar in structure and/or of a unitary structure. Furthermore, the described outer concave extensions of the preferred concave assembly need not be attached to the concaves, nor do they need to be of a dissimilar structure as described, but may have a similar structure to that of the improved concave.

The respective concaves 40,41, associated with rotors 26,27, are substantially identical, and thus, for the sake of brevity and convenience, the structural details of only the left concave 41 will be described in detail in reference to FIGS. 2–6 and particularly FIG. 3 wherein there is shown a perspective view of the improved concave removed from the combine 10.

Now, as viewed in FIG. 3, the improved concave 41 comprises a plurality of longitudinally extending, transversely spaced-apart, rod-like members 53 being supported so as to form an arc about an axis by a subframe assembly that includes front and rear transversely-extending arcuate shaped members 54,55 joined at their respective ends by a pair of spaced apart longitudinally extending elements 56,57. The front and rear support members 54,55 are parallel and the longitudinal elements 56,57 are parallel. The outer ends of both the front and rear support members 54,55 extend outwardly beyond the longitudinal members 56,57 thereby providing means for connecting to the adjusting means 51 which supports the concave 41 in a plurality of spaced relationships, generally beneath the rotor 27. Further, these outer ends provide means for connecting the concave extension 43 to the concave 41 as previously described.

Disposed between the front and rear support members 54,55 and transversely extending between the parallel spaced-apart elements 56,57 is a plurality of intermediate support members 58,59,60,61, similar in shape to the front and rear support members. More specifically, there are four intermediate support members 58,59,60,61, each being disposed generally parallel to the other and generally parallel to the front and rear support members 54,56. The ends of each of the immediate support members 58,59,60,61 are fixed, such as by welding, to the inner sides of the longitudinal elements 56,57.

The spaced apart rod-like members 53 extend longitudinally from the front support member 54 to the rear support member 55 and are seated on some of the support members and are received by others of the support members. More specifically, the top surfaces of the front support member 54, the second intermediate support member 59 and the fourth intermediate support member 61 are notched for seating the rod-like members 53 thereon. The first and third intermediate support members 58,60 respectively and the rear support member 55 are provided with apertures for receiving the rod-like members 53 therethrough. Thus, from left to right in FIG. 3, each of the rod-like members 53 is seated on the front support member 54, received by the first intermediate support member 58, seated on the second intermediate support member 59, received by the third intermediate support member 60, seated on the fourth intermediate support member 61 and is received by the rear support member 55.

Preferably, the rod-like members 53 are equally spaced apart transversely from one another and are generally linear throughout a substantial portion of their longitudinally extent. More specifically, the portions of the rod-like members 53 extending from the first intermediate support member 58 to the rear support member 55 are generally linear. Furthermore, these linear portions are generally parallel to the axis of the rotor 27.

The intermediate supports 59,61 (those members having rod-like members seated thereon) are generally concentric about a common axis (as are the other support members which receive the rod-like members) and are disposed at a lower level than the support members which receive the rod-like members (intermediate supports 58,60 and rear support 55). In other words, the second and fourth intermediate support members 59,61 respectively are each spaced at a radial distance from an axis that is greater than the radial distance at which each of the first and third intermediate support members 58,60 respectively and the rear support member 55 is spaced from said axis. This difference in radial spacings is more clearly shown in FIG. 5 wherein the second intermediate support member 59 is shown disposed at a lower vertical level than the third intermediate support member 60.

Figure 4:
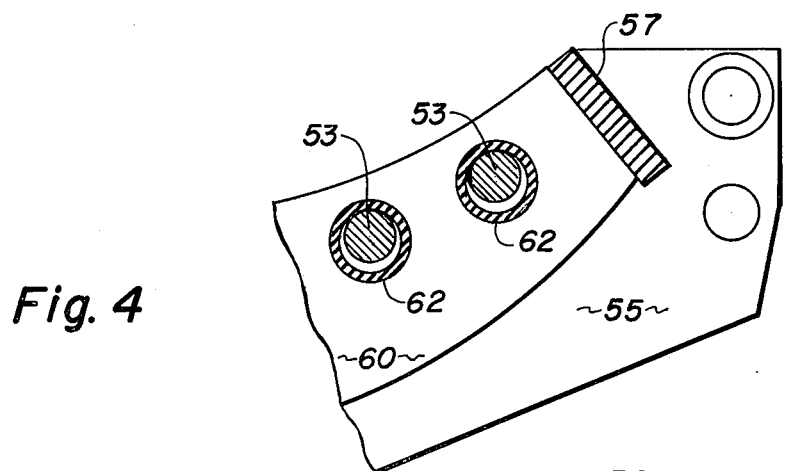
FIG. 4 is an enlarged fragmentary view taken along lne 4—4 of FIG. 3, showing the rod-like members being received by an intermediate support member.
Figure 5:
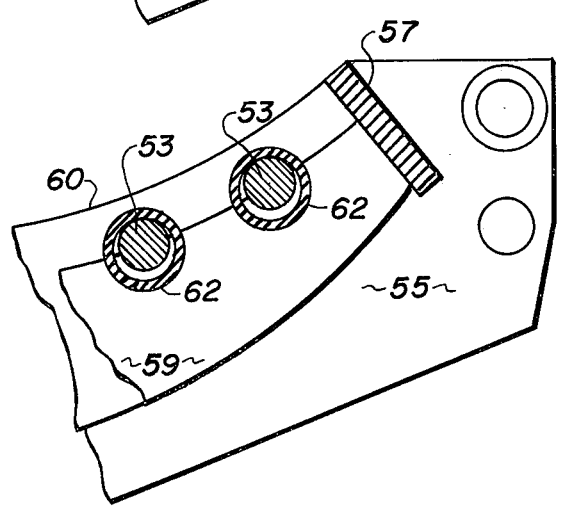
FIG. 5 is an enlarged fragmentary view taken along line 5—5 of FIG. 3, showing the rod-like members seated on an intermediate support member.

Still in reference to FIG. 3 as well as FIGS. 4 and 5, those support members that receive the rod-like members (intermediate supports 58,60 and rear support 55) have upper portions disposed above the rod-like members 53. Preferably, these upper portions are of equal height. The top surface of support members 58,60 and 55 are arcuate shaped, each being spaced an equal distance from a common axis. The function of the upper portions is to control the axial movement of crop material along the concave 41. More particularly, these upper portions tend to retard the flow of kernels of the threshed crop material rearwardly along the rod-like members 53 so that the same may pass quickly through the openings in the combine. Further, in retarding the flow, the crop material is retained in the threshing region for a longer period of time, exposing the same to a repeated threshing action, and thus ensuring a more complete threshing operation.

It should be noted that the height of the upper portions above the rod-like members is instrumental in controlling the flow of crop material along the concave and thus, it should be appreciated by those skilled in the art, that the height of the upper portions can be varied to vary the flow of crop material along the concave. Further, it should be pointed out that the member of support members, as well as, the specific arrangement thereof (as described in reference to FIG. 3 of alternating the support members such that the rod-like members are seated on one member and are received by the next support member) is not critical, but merely, a manner of design choice and is only illustrative of the preferred embodiment.

As viewed in FIGS. 3 and 6, the front portion of the subframe assembly of the improved concave 41 is shown as having a step down configuration forming an inlet region to thereby facilitate the feeding of crop material into the inlet end of the axial flow unit 15. The overall function, purposes and objects of the step down configuration is set forth and claimed in the hereinabove cross-referenced, co-pending application, U.S. Pat. Ser. No. 641,220. However, briefly, the step down configuration provides a combine of the axial flow type with a relief region at the inlet end of the threshing compartment wherein any abnormal masses, bunches or rope-like formation of crop material may be thinned or somewhat smoothed out incident to having the direction of movement thereof abruptly changed from generally axial to substantially circumferential prior to the material being introduced to the more confined major or principal threshing section of the threshing and separating mechanism. Such results in the benefits of savings in power consumption, minimal wear upon the components of the threshing compartment, and otherwise in improved threshing operations performed by the combine.

As mentioned above, the front portion of the subframe assembly of improved concave 41 has a step down configuration, and thus, the front portion of each rod-like member 53 has a step down configuration corresponding to that of the subframe assembly's front portion. More particularly, each of the rod-like members 53, being seated on the front support member 54, extends rearwardly a short distance and then bends upwardly and rearwardly where it joins with its rearwardly extending linear portion. Also, the front portion of each of the longitudinal elements 56,57 is cut away so as to define the step down configuration of the front portion of the frame assembly of the concave.

Still more particularly, the front support member 54, being arcuate shaped, is radially spaced at a distance from a common axis that is greater than the radial distance of the first intermediate support member 58, and thus, is disposed at a lower level than the other support members. Therefore, the front portions of the rod-like member in the inlet region (rearwardly extending parts) are disposed at a lower level than their respective linear portions. Preferably, these rearwardly extending parts are parallel.

In referring to FIG. 6, the upwardly and rearwardly extending parts of the rod-like members in the front inlet region are preferably disposed in generally parallel, vertical planes defined by respective axes of the lower and linear parts of the members 53. In other words, each of the rod-like members 53 are bent or curved straight downwardly from the intermediate support member 58 and thus are not radially disposed or spaced in this particular area.

Further, it should be noted, that the front support member 54 has the same radius of curvature as the second and fourth intermediate support members 59,61 respectively (all the support members that have rod-like members seated thereon) but is disposed at a lower level. Since the support members 54,59 and 61 have the same curvature, the same tooling can be used to notch all three. Still further since support members 54,59 and 61 have identically notched top surfaces and since the front support member is disposed at a lower level than the intermediate supports 59,61, then the front portion of the rod-like members are equally spaced apart thus conforming to the transverse spacings of the respective linear portions of the rod-like members.

The improved concave 41 further includes one or more sleeves 62 rotatably mounted on at least one of the spaced apart rod-like members 53 so as to form openings between adjacent ones of the sleeve members and facilitate the passage of threshold and separated crop material (kernels, grains) therethrough. Sleeves 62 are rotatably mounted on the linear portion (that portion of the rod-like members extending from the first intermediate support member 58 to the rear support member 55) of each of the respective longitudinally extending rod-like members 53 and further, in certain circumstances and under some crop conditions, sleeves 62 are also provided on the rearwardly-extending parts of the front portion of the respective rod-like members 53.

Preferably, each sleeve 62 has an inside diameter greater than the outside diameter of a rod-like member and is inserted thereover. The sleeves 62 are confined on the rod-like members 53 between adjacent support members 54-58-59-60-61-55 and are free to rotate thereabout. As shown, all of the sleeves 62 are of equal diameter, thereby providing an equal spacing between adjacent sleeves on adjacent spaced apart rod-like members. However, it should be noted that the sleeves could be of various diameters, thereby varying the spacings therebetween. The number of sleeves 62, their diameters and the spacing therebetween depends upon the crop material and the condition of the crop material to be harvested. Further, the sleeves 62 can be easily removed from the rod-like members, allowing an operator to remove either some or all of the sleeves on one or more of the rod-like members 53. In so doing, an operator can select the particular arrangement of rod members and sleeves he desires. For example, the sleeves 62 may be removed from the front portion of the rods (inlet region of concave) and/or from any one of the sections of the rod-like members between adjacent support members.

The primary purpose of the freely rotatable sleeve members is to facilitate the passage of threshed crop material through the openings, defined by adjacent sleeves or a sleeve and on adjacent rod-like member, thereby preventing any clogging of the opening which would affect the overall efficiency of the combine operation. Further, these rotatably mounted sleeves have the tendency to reduce the impact forces of the crop material as the same comes into contact with the concave. More particularly, as the rasp bars 33 of the rotor 27 sweep the crop material over the concave 41, the impact of the material striking the rotatable sleeves 62 is not as great as where the material strikes a stationary bar of the conventional concave structure. The resulting force of impact is scattered, thereby decreasing the damage to the threshed crop material and especially the kernels and grain. Furthermore, since the rotatable sleeves 62 facilitate the passage of threshed crop material through the openings, the opportunity for the openings to become blocked or clogged, as is customary in conventional styled concaves, is minimal. Additionally, the freely rotatable sleeve members have the added advantage of enhancing the radial movement of the crop material over the concave thereby increasing the threshing efficiency of the unit.

It is thought that the invention and many of its attendant advantages will be understood from the foregoing description and it will be apparent that various changes may be made in form, construction and arrangement of the improved concave without departing from the spirit and the scope of the invention or sacrificing all of its material advantages, the form hereinbefore described being merely a preferred or exemplary embodiment thereof.

Having thus described the invention, what is claimed is:

1. In an axial flow combine having a mobile frame adapted to be propelled forwardly over a field of grain bearing crop material, at least one longitudinally extending axial flow threshing and separating unit mounted within the frame, said unit including a generally cylindrical casing and a rotor mounted for rotation with the casing, said casing including an improved lower longitudinally extending concave, the rotor having means mounted on the periphery thereof and being operable upon rotation of said rotor and in cooperation with the improved concave to thresh grain from the unthreshed grain bearing crop material introduced into said unit and advance the crop material through said unit while subjecting the crop material to a threshing and separating action wherein threshed and separated grain material passes through said concave to a grain handling and cleaning means disposed underneath said axial flow unit, said improved concave comprising:

a. a plurality of longitudinally extending rod-like members;

b. at least two spaced apart transversely extending arcuate shaped support members for supporting said rod-like members, said rod-like members being arranged to define an arc about a common axis and aligned generally parallel to each other; and c. one or more sleeve members rotatably mounted on at least one of said spaced apart rod-like members so as to define openings between adjacent ones of said members and facilitate the passage of threshed and separated crop material therethrough.

2. The combine as described in claim 1, wherein said rod-like members are equally spaced apart from each other.

3. The combine as described in claim 1, wherein some of said support members receive said rod-like members therethrough and other of said support members have said rod-like members seated thereon, said support members which receive said rod-like members therethrough having upper portions projecting above said rod-like members which tend to retard the advance of said crop material along said concave.

4. The combine as described in claim 3, wherein the top surface of each support member that receives a rod-like member has an arcuate shape and extends parallel to said arc defined by said rod-like members.

5. The combine as described in claim 3, wherein said upper portions of said respective support members are of equal height.

6. The combine as described in claim 1, wherein said sleeves have a larger inside diameter than the outside diameter of said rod-like members.

7. An improved concave for use with an axial flow combine comprising:

a. a support frame including front and rear transversely extending arcuate shaped support members;

b. a plurality of transversely spaced apart longitudinally extending rod-like members supported by said frame and which are linear throughout a substantial portion of their longitudinal extent; and c. one or more sleeves rotatably mounted on some of said spaced apart rod-like members so as to define openings between adjacent ones of said members and facilitate the passage of threshed crop material therethrough.

8. The improved concave as described in claim 7, wherein the linear portions of said rod-like members are substantially parallel.

9. The improved concave as described in claim 7, wherein said front and rear support members are parallel to each other.

10. The improved concave as described in claim 9, wherein said rod-like members are seated on the front support member and are received through openings defined in said rear support member.

11. The improved concave as described in claim 9, wherein said rod-like members are equally spaced from one another.

12. The improved concave as described in claim 9, wherein said frame further includes a pair of spaced apart longitudinally extending support elements, said front and rear transverse support members being mounted between respective ends of said longitudinal support elements, and at least one intermediate support member mounted across said longitudinal elements and disposed between said front and rear support members, said intermediate support member being of similar shape to said front and rear support members and parallel thereto.

13. The improved concave as described in claim 12, wherein some of said support members have said rod-like members seated thereon and other of said support members receive said rod-like members therethrough.

14. The improved concave as described in claim 12, wherein said support members having rod-like members extending therethrough have portions disposed above said rod-like members which tend to retard the advance of crop material along said concave.

15. The improved concave as described in claim 7, wherein a front portion of said frame has a step down configuration forming an inlet region with a front portion of each of said rod-like members having a step down configuration corresponding to that of said frame front portion.

16. The improved concave as described in claim 15, wherein each rod-like member front portion extends a short distance rearwardly from said front support member and then bends upwardly and rearwardly and joins with said linear portion of said rod-like member.

17. The improved concave as described in claim 16, wherein the rearwardly-extending parts of said front portions of said respective rod-like members in said inlet region are parallel to, but disposed at a lower level than, said linear portions of said respective rod-like members.

18. The improved concave as described in claim 15, wherein said frame further comprises at least one intermediate support member disposed between said front and rear support member, said intermediate support member being of a shape similar to said front and rear support member.

19. The improved concave as described in claim 18, wherein the top surface of said rear support member and said intermediate support member located adjacent said front support member are disposed at generally the same level.

20. The improved concave as described in claim 19, wherein the linear portions of said rod-like members extending between said intermediate support member and said rear support member rotatably mount sleeves.

21. In an axial flow combine having a frame adapted to be propelled forwardly over a field of grain bearing crop material, at least one axial flow unit mounted within the frame, and grain handling and cleaning means disposed below said axial flow unit, said axial flow unit including a generally cylindrical longitudinally extending casing and a rotor mounted for rotation within said casing, said casing having a lower longitudinally extending improved concave, said rotor having threshing means mounted on the periphery thereof and operable upon rotation of said rotor to advance crop material through said unit and to thresh grain from said grain bearing crop material, said improved concave comprising:
  a. a front support member, a rear support member and at least one intermediate support member spaced between said front and rear suupport members, said support members being of an arcuate shape and extending transverse to the axis of said longitudinally extending rotor;
  b. a plurality of longitudinally extending rod-like members supported by said support members, said rod-like members being transversely spaced one from the other to define an opening therebetween to allow the passage of threshed crop material therethrough; and
  c. one or more sleeve members mounted on some of said rod-like members so as to be rotatable about said rod-like members upon impact of crop material with said sleeve members to reduce the impact forces on said crop material and thereby decrease damage to said threshed crop material.

22. The combine as described in claim 21, wherein said concave further comprises two transversely spaced-apart longitudinally extending elements for supporting said transverse support members.

23. The combine as described in claim 22, wherein said longitudinal elements are parallel and said transversely extending support members are parallel.

24. The combine as described in claim 21, wherein said intermediate support member and said rear support member are of equal radial distance from the axis of said rotor.

25. The combine as described in claim 22, wherein said front support member is of a greater radial distance from the axis of said rotor than said rear support member.

26. The combine as described in claim 21, wherein said rod-like members are seated on some of said support members and are received through others of said support members.

27. The combine as described in claim 26, wherein said rod-like members are seated on said front support member and extend through said intermediate support member adjacent said front support member.

28. The combine as described in claim 27, wherein the portions of said rod-like members extending from the immediate support member, adjacent said front support member, to said rear support member are generally linear and parallel.

29. The combine as described in claim 28, wherein one or more of said sleeve members are rotatably mounted on each of said portions.

30. The combine as described in claim 29, wherein said sleeve member on one of said rod-like members is laterally spaced from said sleeve member on an adjacent rod-like member to define an opening therebetween through which threshed crop material may pass.

31. The combine as described in claim 21, wherein portions of some of said support members extend above said rod-like members and tend to impede the axial flow of said crop material along said longitudinally extending rod-like members.

32. An improved concave for use with an axial-flow type combine comprising:
  a. a frame including a plurality of arcuate shaped transversely extending spaced apart support members;
  b. a plurality of transversely spaced apart longitudinally extending rod-like members supported by said arcuate shaped members to define a grid system through which threshed and separated crop material may pass;
  c. one or more sleeves inserted over some of said rod-like members, said sleeves being capable of rotating about said rod-like members thereby enhancing the radial movement of crop material over said concave and the passing of threaded and separated crop material through openings defined between adjacent sleeves and adjacent rod-like members.

33. The improved concave as described in claim 32, wherein said sleeves have a larger inside diameter than the outside diameter of said rod-like members.

34. The improved concave as described in claim 32, wherein:
  said plurality of transverse support members includes a front support member and a rear support member; and
  said frame further includes a pair of transversely spaced apart longitudinally extending elements, each one of said elements joining respective ends of said transverse support members.

35. The improved concave as described in claim 32, wherein said rod-like members are seated on some of said support members and received through apertures defined in other of said support members, said support members which receive said rod-like members therethrough having portions disposed above said rod-like members which tend to retard the advance of crop material along said concave.

36. The improved concave as described in claim 35, wherein one sleeve is inserted over each of said rod-like members between each of said adjacent support members.

37. The improved concave as described in claim 34, wherein the top surface of said front support member has an array of spaced notches and said rear support member has an array of spaced apertures, said rod-like members being seated in the notches of said front support member and extending through the apertures of said rear support member.

38. In an axial flow type combine including a generally cylindrical casing having an infeed end arranged to receive crop material in a substantially axial direction, rotor means rotatably mounted within said casing and having threshing means mounted on the periphery thereof, and an improved concave supported within said casing at least partially along the lower surface portion of said rotor means for cooperation with said threshing means to form a region in which crop material is threshed, said improved concave comprising:
  a. a plurality of rod-like members;
  b. a frame for supporting said rod-like members in generally parallel relationship to said axial direction and in an arcuate configuration; and
  c. one or more removable sleeves rotatably mounted on some of said rod-like members for reducing the threshing impact of the crop material against said concave.

39. The combine as described in claim 38, wherein said rod-like members are linear throughout a substantial portion of their longitudinal extent.

40. The combine as described in claim 38, wherein the front portion of said rod-like members has a step-down configuration relative to the remaining portion of said members, said front portion forming an inlet region to said concave.

* * * * *